US012678740B2

(12) United States Patent
Wu et al.

(10) Patent No.: US 12,678,740 B2
(45) Date of Patent: Jul. 14, 2026

(54) COMPOSITE REVERSE OSMOSIS MEMBRANE AND PREPARATION METHOD THEREFOR

(71) Applicant: Vontron Technology Co., Ltd., Guiyang (CN)

(72) Inventors: Zongce Wu, Guiyang (CN); Yan Jin, Guiyang (CN); Lianrui Zhao, Guiyang (CN); Xingsheng Yang, Guiyang (CN); Yonghong Liang, Guiyang (CN); Jun Fang, Guiyang (CN)

(73) Assignee: Vontron Technology Co., Ltd., Guiyang (CN)

( * ) Notice: Subject to any disclaimer, the term of this patent is extended or adjusted under 35 U.S.C. 154(b) by 427 days.

(21) Appl. No.: 18/257,789

(22) PCT Filed: Dec. 6, 2021

(86) PCT No.: PCT/CN2021/135779
§ 371 (c)(1),
(2) Date: Sep. 13, 2023

(87) PCT Pub. No.: WO2022/127637
PCT Pub. Date: Jun. 23, 2022

(65) Prior Publication Data

US 2024/0307829 A1 Sep. 19, 2024

(30) Foreign Application Priority Data

Dec. 17, 2020 (CN) ......................... 202011495171.8

(51) Int. Cl.
*B01D 69/12* (2006.01)
*B01D 71/56* (2006.01)

(52) U.S. Cl.
CPC ......... *B01D 69/1214* (2022.08); *B01D 71/56* (2013.01)

(58) Field of Classification Search
CPC ............ B01D 651/025; B01D 69/1214; B01D 69/1251; B01D 71/56; B01D 71/80; B01D 2325/39
See application file for complete search history.

(56) References Cited

U.S. PATENT DOCUMENTS 6,159,370 A 12/2000 Hicke et al.
9,943,811 B2 4/2018 Perry et al.
(Continued)

FOREIGN PATENT DOCUMENTS

CN 1145918 A 3/1997
CN 1404906 A 3/2003
(Continued)

OTHER PUBLICATIONS

Wilbert, Michelle Chapman, John Pellegrino, and Andrew Zydney. “Bench-scale testing of surfactant-modified reverse osmosis/nanofiltration membranes.” Desalination 115.1 (1998): 15-32. (Year: 1998).*

(Continued)

*Primary Examiner* — Bradley R Spies
(74) *Attorney, Agent, or Firm* — New River Valley IP Law, P.C.; Ashley M. Gates; Michele L. Mayberry

(57) ABSTRACT

The present disclosure relates to a composite reverse osmosis membrane and a preparation method therefor. The preparation method of the present disclosure can realize the preparation of a composite reverse osmosis membrane having a high flux, a high desalinization rate, a high deboration rate and high contamination resistance in a simple operation and high reaction efficiency manner.

14 Claims, 1 Drawing Sheet

(56) References Cited

U.S. PATENT DOCUMENTS

| | | | | |
|---|---|---|---|---|
| 2007/0256969 | A1 | 11/2007 | Ding et al. | |
| 2011/0259817 | A1 | 10/2011 | Mickols et al. | |
| 2012/0273421 | A1 | 11/2012 | Perry et al. | |
| 2014/0299537 | A1 | 10/2014 | Kim et al. | |
| 2017/0043301 | A1* | 2/2017 | Berzinis | B01D 71/5223 |
| 2017/0274377 | A1 | 9/2017 | Yang et al. | |
| 2022/0331744 | A1 | 10/2022 | Hu et al. | |

FOREIGN PATENT DOCUMENTS

| | | | | | |
|---|---|---|---|---|---|
| CN | 101524626 | A | | 9/2009 | |
| CN | 101874989 | A | | 11/2010 | |
| CN | 102348492 | A | | 2/2012 | |
| CN | 102949938 | A | | 3/2013 | |
| CN | 103962019 | A | | 8/2014 | |
| CN | 104941461 | A | | 9/2015 | |
| CN | 105792916 | A | | 7/2016 | |
| CN | 105934271 | A | | 9/2016 | |
| CN | 106232213 | A | | 12/2016 | |
| CN | 106731908 | A | | 5/2017 | |
| CN | 107126851 | A | | 9/2017 | |
| CN | 107174969 | A | * | 9/2017 | B01D 67/0011 |
| CN | 107899436 | A | | 4/2018 | |
| CN | 108392992 | A | | 8/2018 | |
| CN | 105435660 | A | | 9/2018 | |
| CN | 109304099 | A | | 2/2019 | |
| CN | 110394073 | A | | 11/2019 | |
| CN | 111151137 | A | | 5/2020 | |
| CN | 111659270 | A | | 9/2020 | |
| CN | 112426894 | A | | 3/2021 | |
| CN | 107743417 | B | | 8/2021 | |
| EP | 3056260 | A1 | * | 8/2016 | B01D 71/80 |
| JP | 2002502692 | A | | 1/2002 | |
| JP | 2006043655 | A | | 2/2006 | |
| JP | 2018103097 | A | | 7/2018 | |
| WO | 9940996 | A1 | | 8/1999 | |
| WO | 2010082194 | A2 | | 7/2010 | |
| WO | 2014168584 | A1 | | 10/2014 | |
| WO | 2015044941 | A1 | | 4/2015 | |
| WO | 2022127637 | A1 | | 6/2022 | |
| WO | 2023087481 | A1 | | 5/2023 | |

OTHER PUBLICATIONS

Yao, Xue-ping et al—CN107174969A machine translation—Sep. 19, 2017 (Year: 2017).*

Wang, Yan et al—CN110394073A machine translation—Jan. 11, 2019 (Year: 2019).*

Hahn, Janina et al—EP3056260A1 machine translation—Aug. 17, 2016 (Year: 2016).*

(Liang, Songmiao et al.) Co-Pending International Application No. PCT/CN2021/135779, filed Dec. 6, 2021, specification, claims, and figures (see WO2022/127637).

Co-Pending International Application No. PCT/CN2021/135779, International Search Report dated Mar. 1, 2022, 5 pages.

(Hu, Lijie et al.) Co-pending U.S. Appl. No. 17/634,675, filed Feb. 11, 2022, specification, claims, and figures.

(Hu, Lijie et al.) Co-pending International Application No. PCT/CN2019/120224, filed Nov. 22, 2019, Specification, claims, and figures (see WO2021/093001).

(Liang, Songmiao et al.) Co-pending U.S. Appl. No. 18/257,230, filed Jun. 13, 2023, specification, claims, and figures.

(Liang, Songmiao et al.) Co-pending International Application No. PCT/CN2021/140077, filed Dec. 21, 2023, Specification, Claims, and Figures, 15 pages (see WO2023/087481).

Co-pending U.S. Appl. No. 17/634,675, Preliminary Amendment dated Feb. 11, 2022, 7 pages.

Co-pending U.S. Appl. No. 18/257,230, Preliminary Amendment dated Jun. 14, 2023, 6 pages.

Co-pending International Application No. PCT/CN2019/120224, International Search Report and Written Opinion (8 pages) with English translation of the the International Search Report (2 pages).

Co-pending International Application No. PCT/CN2021/140077, International Search Report dated Aug. 16, 2022 (10 pages) and English translation (2 pages).

Hu, Ruirui et al. "Graphene oxide-in-polymer nanofiltration membranes with enhanced permeability by interfacial polymerization", Journal of Membrane Science 564 (2018) 813-819.

Liu Chao-feng and FANG Shao-ming, "Progress in preparation techniques of nanofiltration membrane at home and abroad", Technology of Water Treatment, vol. 33, No. 6, Jun. 2007, 5 pages (including English Abstract).

Wu, M. et al. "Ultrathin nanofiltration membrane with polydopamine-covalent organic framework interlayer for enhanced permeability and structural stability", Journal of Membrane Science, 576 (2019) 131-141.

(Hu, Lijie et al.) Co-pending U.S. Appl. No. 17/634,675, filed Feb. 11, 2022, file history through Jan. 2025, 32 pages.

Co-pending U.S. Appl. No. 18/257,230, Notice of Allowance dated Sep. 9, 2025, 6 pages.

Co-Pending International Application No. PCT/CN2021/135779, English Translation of the International Search Report and Written Opinion dated Mar. 1, 2022, 10 pages.

Co-pending International Application No. PCT/CN2021/140077, International Written Opinion dated Aug. 16, 2022 (3 pages) and English translation (4 pages).

* cited by examiner

COMPOSITE REVERSE OSMOSIS MEMBRANE AND PREPARATION METHOD THEREFOR

TECHNICAL FIELD

The present disclosure relates to the technical field of reverse osmosis membranes, and specifically relates to a composite revers osmosis membrane for seawater desalination and a preparation method therefor. The preparation method of the present disclosure may realize the preparation of a composite reverse osmosis membrane having a high flux, a high desalination rate, a high boron removal rate and high contamination resistance in a simple and easy-to-operate manner with high reaction efficiency.

BACKGROUND

The composite reverse osmosis membrane, as one of the core materials in membrane separation technology, has been widely applied in fields such as wastewater treatment, drinking water enhancement, reclaimed water reuse, and seawater desalination, and plays an increasingly important role in promoting high-quality economic development and ensuring ecological environment. Faced with increasingly demanding application environments, operating cost control, and diversification of contaminated water sources, higher requirements have been put forward for reverse osmosis membrane systems and membrane materials in terms of energy consumption, desalination rate, and contamination resistance.

In addition to the above-mentioned requirements, the composite reverse osmosis (RO) membranes for seawater desalination, as one of the branches of reverse osmosis membrane materials with the highest technical level, greatest production difficulties and widest application, also face the challenge of boron removal from seawater. In view of this, during the design, development, and industrialization of composite reverse osmosis membranes for seawater desalination, as the requirement of common system, researchers often pay simultaneous attention to the performance requirements of membrane materials such as water flux, desalination rate, contamination resistance, and boron removal capacity, and strive to provide a membrane product that may meet the above four requirements simultaneously. Therefore, the research and production of composite reverse osmosis membranes for seawater desalination are more complicated than ordinary low-pressure composite reverse osmosis membranes.

In the aspect of enhancing water flux of the composite osmotic membrane, patent application CN201680025296.X discloses a method for enhancing the flux of the composite reverse osmosis membrane by using a metal chelate containing a metal atom or metal ion and a bidentate ligand, but the composite reverse osmosis membrane prepared by this method has a low desalination rate; patent application CN201510988458.7 discloses an anti-contamination composite multi-layer polymer separation membrane and a preparation method therefor, the membrane has a multi-layer structure including a support layer and a hydrophilic interception functional layer formed on the support layer, and the hydrophilic interception functional layer is formed of a polysulfone block copolymer containing hydrophilic blocks; although the hydrophilicity of the membrane is enhanced, the desalination rate of the membrane is still at a low level because a polyamide desalination layer is not introduced.

In view of the foregoing, it is imperative to develop a composite reverse osmosis membrane having a high flux, a high desalination rate, a high boron removal rate, and high contamination resistance simultaneously.

SUMMARY

Technical Problem

To solve the above problems in the prior art, an object of the present disclosure is to provide a composite reverse osmosis membrane and a preparation method therefor so as to prepare a composite reverse osmosis membrane having a high flux, a high desalination rate, a high boron removal rate and high contamination resistance in a simple and easy-to-operate manner with high reaction efficiency.

Solution to Problem

In order to achieve the above object, the inventors of the present disclosure conducted diligent research and discovered that by forming an amphiphilic block copolymer modification layer on the surface of a polymer porous support layer, the bidirectional diffusion of amine monomers and acyl chloride monomers in subsequent interfacial polymerization reaction may be effectively regulated, thereby preparing a thicker polyamide functional layer (also known as polyamide desalination layer) having higher crosslinking degree, thus enhancing the binding force between the polyamide desalination layer and the polymer porous support layer, and as a result, the desalination rate of the composite reverse osmosis membrane is improved. By incorporating an ether having a cyclic structure into the polyamide network via physical doping or chemical bonding through in-situ interfacial polymerization, a hybrid polyamide functional layer (also called hybrid polyamide desalination layer) containing an ether having a cyclic structure is formed on the polymer porous support layer modified by the amphiphilic block copolymer, which may effectively enhance the hydrophilicity of the desalination layer and consequently improves the water flux and anti-contamination capability of the composite reverse osmosis membrane.

One aspect of the present disclosure relates to a composite reverse osmosis membrane, comprising a non-woven fabric layer, a polymer porous support layer, an amphiphilic block copolymer modification layer, and a hybrid polyamide functional layer, wherein the amphiphilic block copolymer contains hydrophilic blocks and lipophilic blocks, the hybrid polyamide functional layer contains an ether having a cyclic structure present in the hybrid polyamide functional layer in a physical doping mode or a chemical bonding mode.

In the composite reverse osmosis membrane of the present disclosure, the polymer porous support layer is one or more of polysulfone porous support layer, polyethersulfone porous support layer, polyacrylonitrile porous support layer, polyethyleneimine porous support layer, polyarylethersulfone ketone porous support layer, polyvinylidene fluoride porous support layer, and sulfonated polyethersulfone porous support layer; the polyamide is aromatic polyamide and/or aliphatic polyamide.

In the composite reverse osmosis membrane of the present disclosure, the amphiphilic block copolymer has an HLB value of 3 to 40.

In the composite reverse osmosis membrane of the present disclosure, the amphiphilic block copolymer modification layer contains one or more of the following block copolymers: polystyrene-b-polyethylene glycol, DL-polylactic acid-b-polyacrylic acid, polyglycolide-b-polyethylene glycol-polyglycolide, polystyrene-b-DL-polylactic acid, polystyrene-b-L-polylactic acid, polyethylene glycol-b-polyethyleneimine, polycaprolactone-b-polyethyleneimine, polylactic acid-glycolic acid-b-polylysine, polyethylene glycol-b-polylactic acid-polycaprolactone, polylactic acid-polycaprolactone-b-polyethylene glycol-maleimide, polylactic acid-polycaprolactone-b-polyethylene glycol-amino, polylactic acid-polycaprolactone-b-polyethylene glycol-carboxyl, polylactic acid-polycaprolactone-b-polyethylene glycol-activated ester, polylactic acid-b-polyethylene glycol amino, polylactic acid-b-polyethylene glycol carboxyl, polylactic acid-b-polyethylene glycol hydroxyl, polylactic acid-polycaprolactone-b-polyethylene glycol-folic acid, polylactic acid-polyallyl lactide-b-polyethylene glycol-amino, polylactic acid-polyallyl lactide-b-polyethylene glycol, polylactic acid-polyallyl lactide-b-polyethylene glycol-maleimide, polylactic acid-polycaprolactone-b-polyethylene glycol, polyacrylic acid-b-polyacrylamide, polyacrylic acid-b-polymethyl methacrylate, poly(n-butyl acrylate)-b-polyacrylic acid, poly(n-butyl acrylate)-b-polyacrylamide, poly(tert-butyl methacrylate)-b-polyoxyethylene, polymethyl methacrylate-b-polyacrylic acid, polyneopentyl ester-b-polymethacrylic acid, polyoxyethylene-b-polyacrylic acid, polyoxyethylene-b-polyacrylamide, polytetrahydrofuran-b-polyoxybutylene, polyoxyethylene-b-polycaprolactone, polyoxyethylene-b-polylactic acid, polyoxyethylene-b-polypropylene oxide, polyoxyethylene-b-poly(nitrobenzyl methacrylate), polyoxyethylene-b-poly (N-isopropylacrylamide), polyoxyethylene-b-poly(tert-butyl acrylate), polyoxyethylene-b-poly(tert-butyl methacrylate), polyoxyethylene-b-polymethyloxazoline, polyoxyethylene-b-polylactide, polyisobutylene-b-polyacrylic acid, polyisobutylene-b-polyoxyethylene, polystyrene-b-polyacrylamide, polystyrene-b-polyacrylic acid, polystyrene-b-polymethacrylic acid, polystyrene-b-poly(sodium acrylate), polystyrene-b-polypropylacrylic acid, polystyrene sulfonic acid-b-polymethylbutene, poly(sodium 4-styrene sulfonate)-b-polyoxyethylene, polydimethylsiloxane-b-polyoxyethylene, polydimethylsiloxane-b-polymethacrylic acid, polyvinylpyridine-b-polyoxyethylene, polymethacrylic acid-b-polyneopentyl ester, polymethacrylic acid-b-poly(hydroxyethyl methacrylate), polymethacrylic acid-b-polycaprolactone, polystyrene-b-poly(benzyl acrylate), polystyrene-b-polylactic acid, polystyrene-b-poly(ethyl methacrylate), polystyrene-b-poly (butyl methacrylate), polystyrene-b-poly(hydroxypropyl methacrylate), polystyrene-b-poly(hydroxyethyl methacrylate), poly(lactic acid glycolic acid)-b-polyethylene glycol maleimide, poly(lactic acid glycolic acid)-b-polyethylene glycol carboxyl, poly(lactic acid glycolic acid)-b-polyethylene glycol amino, poly(lactic acid glycolic acid) copolymer-b-polyethylene glycol hydroxyl, poly(lactic acid glycolic acid) copolymer-b-polyethylene glycol active ester, poly (lactic acid glycolic acid) copolymer-b-polyethylene glycol active ester, poly(lactic acid glycolic acid) copolymer-b-polyethylene glycol biotin, poly(lactic acid glycolic acid) copolymer-b-polyethylene glycol azide, poly(lactic acid glycolic acid) copolymer-b-polyethylene glycol phospholipid, poly(lactic acid glycolic acid) copolymer-b-polyethylene glycol aldehyde group, poly(lactic acid glycolic acid) copolymer-b-polyethylene glycol propylene ester, and poly(lactic acid glycolic acid) copolymer-b-polyethyleneimine.

In the composite reverse osmosis membrane of the present disclosure, the ether having a cyclic structure is a cyclic ether containing a structural unit $(CH_2CH_2Y)_n$, wherein Y is at least one selected from heteroatoms O, N, S, and P, n is an integer and $3 \leq n \leq 10$.

Another aspect of the present disclosure relates to a preparation method for a composite reverse osmosis membrane, comprising steps of:

preparing a base membrane, wherein the base membrane comprises a polymer porous support layer on a non-woven fabric layer;

preparing an amphiphilic block copolymer solution as a first solution and coating the solution on the polymer porous support layer to form an amphiphilic block copolymer modification layer;

contacting the non-woven fabric formed with the amphiphilic block copolymer modification layer and the polymer porous support layer with an aqueous solution containing an amine monomer as a second solution and an oil-phase solution containing an acyl chloride monomer as a third solution in sequence, wherein at least one of the second solution and the third solution contains an ether having a cyclic structure to form a hybrid polyamide functional layer containing the ether having a cyclic structure;

performing post-treatment and drying to obtain a composite reverse osmosis membrane.

According to the preparation method for a composite reverse osmosis membrane of the present disclosure, the polymer porous support layer is one or more of polysulfone porous support layer, polyethersulfone porous support layer, polyacrylonitrile porous support layer, polyethyleneimine porous support layer, polyarylethersulfone ketone porous support layer, polyvinylidene fluoride porous support layer, and sulfonated polyethersulfone porous support layer; the polyamide is aromatic polyamide and/or aliphatic polyamide.

According to the preparation method for a composite reverse osmosis membrane of the present disclosure, the first solution comprises an amphiphilic block copolymer and a first solvent, the amphiphilic block copolymer contains hydrophilic blocks and lipophilic blocks, the amphiphilic block copolymer has an HLB value of 3 to 40, and the first solvent is one or more of methanol, ethanol, propanol, butanol, acetone, tetrahydrofuran, dimethyl sulfoxide, sulfolane, N,N-dimethylformamide, N,N-dimethylacetamide, water, toluene, xylene, chloroform, ISOPAR-G, ISOPAR-E, ISOPAR-L, n-butane, n-heptane, cyclohexane, and ethyl cyclohexane; preferably, the concentration of the amphiphilic block copolymer in the first solution is 0.01 wt. % to 10 wt. %.

According to the preparation method for a composite reverse osmosis membrane of the present disclosure, the ether having a cyclic structure is a cyclic ether containing a structural unit $(CH_2CH_2Y)_n$, wherein Y is at least one selected from heteroatoms O, N, S, and P, n is an integer and $3 \leq n \leq 10$; preferably, the concentration of the ether having a cyclic structure in at least one of the second solution and the third solution is 0.01 wt. % to 10 wt. %.

According to the preparation method for a composite reverse osmosis membrane of the present disclosure, the amine monomer is one or more of aniline, m-phenylenediamine, p-phenylenediamine, o-phenylenediamine, 1,3,5-triaminobenzene, 1,2,4-triaminobenzene, 3,5-diaminobenzoic acid, 2,4-diaminotoluene, 2,4-diaminoanisole, 2,4-diaminophenol dihydrochloride, dimethyl phenylenediamine, 1,4-cyclohexanediamine, 1,2-cyclohexanediamine, piperazine, ethylene glycol amine, ethylenediamine, propanediamine, butanediamine, hexamethylenediamine, ethanolamine, polyethyleneimine, triethylamine, tri(2-aminoethyl) amine, diethylenetriamine, N-(2-hydroxyethyl)ethylenediamine, 1,3-cyclohexanediamine, 1,3-dipiperidylpropane, 4-aminomethylpiperazine, ethanolamine, diethanolamine, hexanediol amine, and diglycolamine, and in the second solution, the concentration of the amine monomer is 0.5 wt. % to 10 wt. %.

The acyl chloride monomer is one or more of phthaloyl chloride, isophthaloyl chloride, terephthaloyl chloride, biphenyl-4,4'-dicarbonyl dichloride, trimesoyl chloride, and a ternary acyl chloride having a structure represented by the following general formula (1):

General formula (1)

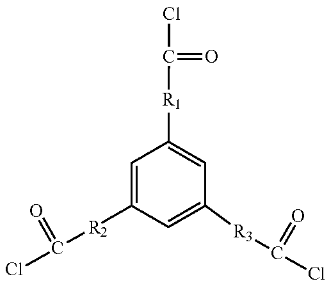

wherein $R_1$, $R_2$, $R_3$ are each independently at least one of the following groups:

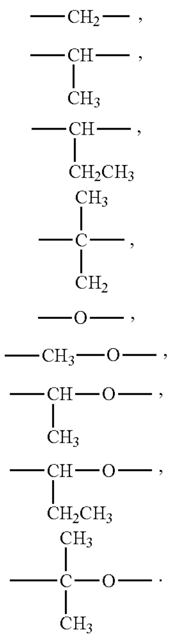

In the third solution, the concentration of the acyl chloride monomer is 0.05 wt. % to 5 wt. %.

Effects

Under standard test conditions, the composite reverse osmosis membrane provided by the present disclosure has a removal rate of over 99.85% for sodium chloride, a removal rate of over 93% for boron, a water flux of 20-30 GFD, and excellent contamination resistance.

DETAILED DESCRIPTION

Figure 1:
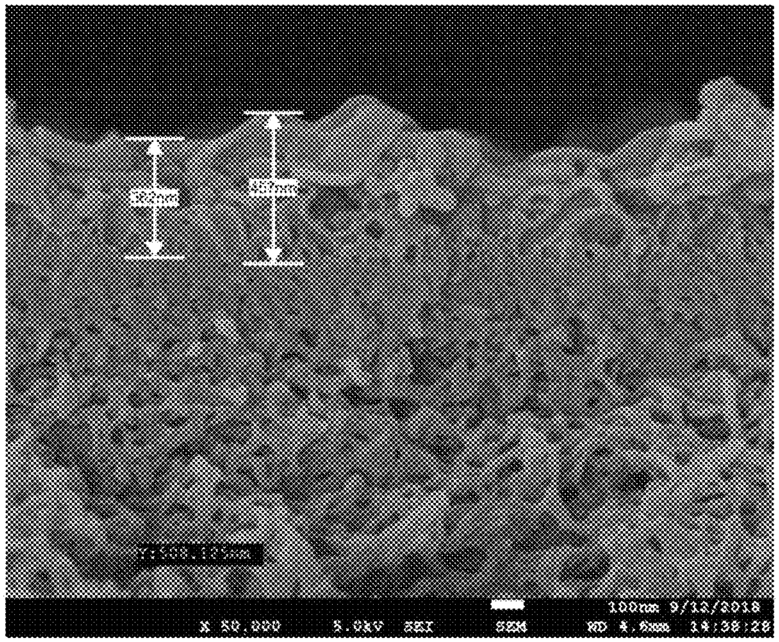
FIG. 1 is a scanning electron microscope image of the cross section of a composite reverse osmosis membrane prepared in Example 1 of the present disclosure.

The present disclosure relates to a composite reverse osmosis membrane, comprising a non-woven fabric layer, a polymer porous support layer, an amphiphilic block copolymer modification layer, and a hybrid polyamide functional layer, wherein the amphiphilic block copolymer contains hydrophilic blocks and lipophilic blocks, the hybrid polyamide functional layer contains an ether having a cyclic structure present in the hybrid polyamide functional layer in a physical doping mode or a chemical bonding mode.

The technical concept of the composite reverse osmosis membrane of the present disclosure involves the formation of an amphiphilic block copolymer modification layer on the surface of a polymer porous support layer, which effectively regulates the bidirectional diffusion of amine monomers and acyl chloride monomers in subsequent interfacial polymerization reaction, thereby preparing a thicker polyamide functional layer (also known as polyamide desalination layer) having higher crosslinking degree, thus enhancing the binding force between the polyamide desalination layer and the polymer porous support layer, and as a result, the desalination rate of the composite reverse osmosis membrane is improved; by incorporating an ether having a cyclic structure into the polyamide network via physical doping or chemical bonding through in-situ interfacial polymerization, a hybrid polyamide functional layer (also called hybrid polyamide desalination layer) containing an ether having a cyclic structure is formed on the polymer porous support layer modified by the amphiphilic block copolymer, which effectively enhances the hydrophilicity of the desalination layer and consequently improves the water flux and anti-contamination capability of the composite reverse osmosis membrane.

In the composite reverse osmosis membrane of the present disclosure, the polymer porous support layer is one or more of polysulfone porous support layer, polyethersulfone porous support layer, polyacrylonitrile porous support layer, polyethyleneimine porous support layer, polyarylethersulfone ketone porous support layer, polyvinylidene fluoride porous support layer, and sulfonated polyethersulfone porous support layer; the polyamide is aromatic polyamide and/or aliphatic polyamide.

In the composite reverse osmosis membrane of the present disclosure, the amphiphilic block copolymer has a weight average molecular weight in the range of $1\times10^3$ to $1\times10^9$, preferably in the range of $1\times10^3$ to $1\times10^7$, more preferably in the range of $1\times10^4$ to $1\times10^6$; the amphiphilic block copolymer has an HLB value (hydrophilic-lipophilic balance value) of 3 to 40, preferably 10 to 40, and more preferably 10 to 20. When the HLB value is lower than 3, the hydrophobicity of the amphiphilic block copolymer is too strong, so it is difficult to effectively control the diffusion process of interfacial polymerization, and the bonding force between the polyamide desalination layer and the polymer porous support layer may not be improved. When the HLB value is higher than 40, the amphiphilic block copolymer may be dissolved in the water phase because of its strong hydrophilicity, and it is difficult to achieve the purpose of the present disclosure.

In the composite reverse osmosis membrane of the present disclosure, the amphiphilic block copolymer modification layer contains one or more of the following block copolymers: polystyrene-b-polyethylene glycol, DL-polylactic acid-b-polyacrylic acid, polyglycolide-b-polyethylene glycol-polyglycolide, polystyrene-b-DL-polylactic acid, polystyrene-b-L-polylactic acid, polyethylene glycol-b-polyethyleneimine, polycaprolactone-b-polyethyleneimine, polylactic acid-glycolic acid-b-polylysine, polyethylene glycol-b-polylactic acid-polycaprolactone, polylactic acid-polycaprolactone-b-polyethylene glycol-maleimide, polylactic acid-polycaprolactone-b-polyethylene glycol-amino, polylactic acid-polycaprolactone-b-polyethylene glycol-carboxyl, polylactic acid-polycaprolactone-b-polyethylene glycol-activated ester, polylactic acid-b-polyethylene glycol amino, polylactic acid-b-polyethylene glycol carboxyl, polylactic acid-b-polyethylene glycol hydroxyl, polylactic acid-polycaprolactone-b-polyethylene glycol-folic acid, polylactic acid-polyallyl lactide-b-polyethylene glycol-amino, polylactic acid-polyallyl lactide-b-polyethylene glycol, polylactic acid-polyallyl lactide-b-polyethylene glycol-maleimide, polylactic acid-polycaprolactone-b-polyethylene glycol, polyacrylic acid-b-polyacrylamide, polyacrylic acid-b-polymethyl methacrylate, poly(n-butyl acrylate)-b-polyacrylic acid, poly(n-butyl acrylate)-b-polyacrylamide, poly(tert-butyl methacrylate)-b-polyoxyethylene, polymethyl methacrylate-b-polyacrylic acid, polyneopentyl ester-b-polymethacrylic acid, polyoxyethylene-b-polyacrylic acid, polyoxyethylene-b-polyacrylamide, polytetrahydrofuran-b-polyoxybutylene, polyoxyethylene-b-polycaprolactone, polyoxyethylene-b-polylactic acid, polyoxyethylene-b-polypropylene oxide, polyoxyethylene-b-poly(nitrobenzyl methacrylate), polyoxyethylene-b-poly(N-isopropylacrylamide), polyoxyethylene-b-poly(tert-butyl acrylate), polyoxyethylene-b-poly(tert-butyl methacrylate), polyoxyethylene-b-polymethyloxazoline, polyoxyethylene-b-polylactide, polyisobutylene-b-polyacrylic acid, polyisobutylene-b-polyoxyethylene, polystyrene-b-polyacrylamide, polystyrene-b-polyacrylic acid, polystyrene-b-polymethacrylic acid, polystyrene-b-poly(sodium acrylate), polystyrene-b-polypropylacrylic acid, polystyrene sulfonic acid-b-polymethylbutene, poly(sodium 4-styrene sulfonate)-b-polyoxyethylene, polydimethylsiloxane-b-polyoxyethylene, polydimethylsiloxane-b-polymethacrylic acid, polyvinylpyridine-b-polyoxyethylene, polymethacrylic acid-b-polyneopentyl ester, polymethacrylic acid-b-poly(hydroxyethyl methacrylate), polymethacrylic acid-b-polycaprolactone, polystyrene-b-poly(benzyl acrylate), polystyrene-b-polylactic acid, polystyrene-b-poly(ethyl methacrylate), polystyrene-b-poly(butyl methacrylate), polystyrene-b-poly(hydroxypropyl methacrylate), polystyrene-b-poly(hydroxyethyl methacrylate), poly(lactic acid glycolic acid)-b-polyethylene glycol maleimide, poly(lactic acid glycolic acid)-b-polyethylene glycol carboxyl, poly(lactic acid glycolic acid)-b-polyethylene glycol amino, poly(lactic acid glycolic acid) copolymer-b-polyethylene glycol hydroxyl, poly(lactic acid glycolic acid) copolymer-b-polyethylene glycol active ester, poly(lactic acid glycolic acid) copolymer-b-polyethylene glycol active ester, poly(lactic acid glycolic acid) copolymer-b-polyethylene glycol biotin, poly(lactic acid glycolic acid) copolymer-b-polyethylene glycol azide, poly(lactic acid glycolic acid) copolymer-b-polyethylene glycol phospholipid, poly(lactic acid glycolic acid) copolymer-b-polyethylene glycol aldehyde group, poly(lactic acid glycolic acid) copolymer-b-polyethylene glycol propylene ester, and poly(lactic acid glycolic acid) copolymer-b-polyethyleneimine.

The amphiphilic block copolymer modification layer more preferably comprises one or more of the following block copolymers: polystyrene-b-polyethylene glycol, polylactic acid-polyallyl lactide-b-polyethylene glycol-amino.

In the composite reverse osmosis membrane of the present disclosure, the ether having a cyclic structure is a cyclic ether containing a structural unit $(CH_2CH_2Y)_n$, wherein Y is at least one selected from heteroatoms O, N, S, and P, n is an integer and $3 \leq n \leq 10$, and preferably, n is 4, 5, 6 and 8.

In the composite reverse osmosis membrane of the present disclosure, the ether having a cyclic structure preferably is one or more selected from the following substances: aza-18-crown ether-6, 18-crown ether-6, 15-crown ether-5, fluorine-containing crown ether, thiacrown ether, naphthalene methyl aza crown ether, carbon-based calixarene crown ether, 2-hydroxymethyl-12-crown ether-4, 2-hydroxymethyl-18-crown ether-6, dicyclohexyl-18-crown ether-6, tetraphenylethene bis-crown ether, benzo-aza 15-crown-5, bis (benzo-aza 15-crown-5), triaza 15-crown-5, diaza 18-crown-6, dibenzo-18-crown ether-6, benzo-18-crown ether-6, dibenzo-24-crown ether-8, dicyclohexane-18-crown (ether)-6, 12-crown ether-4, aza-12-crown ether-4, benzo-15-crown ether-5, 1,4,7-triazacyclononane 18-crown ether-6, cycleanine (also known as 1,4,7,10-tetraazacyclododecane), 1,3-dimethoxy crown ether (without a structural unit $(CH_2CH_2Y)_n$), 1,4,8,11-tetraazacyclotetradecane, dicyclohexane-18-crown ether-6, triptycene-derived tri(crown ether), pentiptycene-derived mono(crown ether), 4,4-dibenzo-24-crown ether-8, 2,3-naphtho-15-crown ether-5, 1,1-dimethylsila-17-crown ether-6, 4-vinylbenzo-18-crown ether-6, and 4'-aminobenzo-18-crown ether-6.

In the hybrid polyamide functional layer containing an ether having a cyclic structure, the content of the ether having a cyclic structure is 0.01 wt. % to 50 wt. %, preferably is 0.1 wt. % to 20 wt. %. When the content is less than 0.01 wt. %, the content of the ether having a cyclic structure is too low, which has limited influence on the structure and properties of the functional layer; when the content is higher than 50 wt. %, the continuous network structure of the functional layer will be destroyed, so that the crosslinking degree of polyamide will decrease and the desalination layer will become thin and loose, thus affecting the performance of the membrane.

The preparation method for a composite reverse osmosis membrane comprises steps of:

- preparing a base membrane, wherein the base membrane comprises a polymer porous support layer on a non-woven fabric layer;
- preparing an amphiphilic block copolymer solution as a first solution and coating the solution on the polymer porous support layer to form an amphiphilic block copolymer modification layer;
- contacting the non-woven fabric formed with the amphiphilic block copolymer modification layer and the polymer porous support layer with an aqueous solution containing an amine monomer as a second solution and an oil-phase solution containing an acyl chloride monomer as a third solution in sequence, wherein at least one of the second solution and the third solution contains an ether having a cyclic structure to form a hybrid polyamide functional layer containing the ether having a cyclic structure;
- performing post-treatment and drying to obtain a composite reverse osmosis membrane.

According to the preparation method for a composite reverse osmosis membrane of the present disclosure, the polymer porous support layer is one or more of polysulfone porous support layer, polyethersulfone porous support layer, polyacrylonitrile porous support layer, polyethyleneimine porous support layer, polyarylethersulfone ketone porous support layer, polyvinylidene fluoride porous support layer and sulfonated polyethersulfone porous support layer; the polyamide is aromatic polyamide and/or aliphatic polyamide.

Optionally, the polymer porous support layer may be formed by coating a polymer solution as a casting solution on a non-woven fabric layer. Optionally, the polymer solution contains a polymer and a solvent, wherein the polymer is one or more of polysulfone, polyethersulfone, polyacrylonitrile, polyethyleneimine, polyarylethersulfone ketone, polyvinylidene fluoride and sulfonated polyethersulfone. Preferably, the polymer is polysulfone, polyethersulfone, and more preferably is polysulfone.

The polysulfone used in the present disclosure is not specifically limited, and it may be bisphenol-A type PSF (commonly referred to as PSF), polyarylsulfone and polyethersulfone. One polysulfone may be used alone or a random combination of multiple polysulfones may be used. Where a combination of multiple polysulfones is used, there is no particular limitation to the mass ratio of the different kinds of polysulfones.

The solvent contained in the polymer solution used in the present disclosure is not specifically limited, and the solvent may be one or more of N,N-dimethylformamide DMF, N,N-dimethylpyrrolidone, N,N-dimethylacetamide, dimethyl sulfoxide, n-hexane, cyclohexane, n-heptane, isoalkane solvent Isopar G, chloroform, trichloromethane, toluene, benzene, methanol and propanol.

Preferably, the concentration of the polymer in the polymer solution is 10 wt. % to 25 wt. %. When the concentration is within this range, the prepared membrane has more excellent quality (such as membrane strength, pore size, etc.). If the concentration of the polymer in the casting solution is less than 10 wt. %, the concentration of the casting solution is too low, and the structure of the prepared membrane is too loose, so that the membrane has reduced strength and is easy to be damaged, and the pore size is too large to achieve an interception effect, and even the viscosity of the casting solution is too low to form a membrane. If the concentration of the polymer in the casting solution exceeds 25 wt. %, the casting solution has a too high concentration and high viscosity, and the prepared membrane has a too dense structure which leads to a decreased porosity and reduced roughness, and the membrane has more defects and poor interception performance. The concentration is preferably 10 wt. % to 20 wt. %, and more preferably 16 wt. % to 20 wt. %, which may further enhance the quality of the prepared membrane material.

According to the preparation method for a composite reverse osmosis membrane of the present disclosure, the first solution comprises an amphiphilic block copolymer and a first solvent, wherein the amphiphilic block copolymer contains hydrophilic blocks and lipophilic blocks. The specific description of the amphiphilic block copolymer is described in the above-mentioned section about the composite reverse osmosis membrane.

The first solvent is one or more of methanol, ethanol, propanol, butanol, acetone, tetrahydrofuran, dimethyl sulfoxide, sulfolane, N,N-dimethylformamide, N,N-dimethylacetamide, water, toluene, xylene, chloroform, ISOPAR-G, ISOPAR-E, ISOPAR-L, n-butane, n-heptane, cyclohexane and ethyl cyclohexane.

Preferably, the concentration of the amphiphilic block copolymer in the first solution is 0.01 wt. % to 10 wt. %, preferably 0.1 wt. % to 2 wt. %. When the concentration is lower than 0.01 wt. %, the content of amphiphilic block copolymer is too small to form a modification layer, which may not effectively regulate the bidirectional diffusion properties of amine monomers and acyl chloride monomers in the interfacial polymerization process, and may not improve the binding force between the polyamide desalination layer and the polysulfone ultrafiltration support layer at the same time; when the concentration is higher than 10 wt. %, the modification layer will have a great influence on the pore size and porosity of the polymer support layer, and as a result, the flux of the prepared composite membrane will decrease.

According to the preparation method for a composite reverse osmosis membrane of the present disclosure, the ether having a cyclic structure is a cyclic ether containing a structural unit $(CH_2CH_2Y)_n$, wherein Y is at least one selected from heteroatoms O, N, S and P, n is an integer and $3 \leq n \leq 10$; the concentration of the ether having a cyclic structure in at least one of the second solution and the third solution is 0.01 wt. % to 10 wt. %, preferably 0.1 wt. % to 8 wt. %. When the content is less than 0.01 wt. %, the content of the ether having a cyclic structure is too low, which has limited regulation on the structure and properties of the functional layer; when the content is higher than 10 wt. %, the continuous network structure of the functional layer will be destroyed, so that the crosslinking degree of polyamide will decrease and the desalination layer will become thin and loose, thus affecting the performance of the membrane.

At least one of the second solution and the third solution comprises an ether having a cyclic structure, which may be added either to a water phase solution as the second solution or to an oil phase solution as the third solution. Excellent technical effects may be achieved regardless of whether the ether is added to the water phase or the oil phase, and a membrane prepared by adding the ether to the water phase has better comprehensive performance.

For detailed description of the ether having a cyclic structure, please refer to the above-mentioned section about the composite reverse osmosis membrane.

According to the preparation method for a composite reverse osmosis membrane of the present disclosure, the amine monomer is one or more of aniline, m-phenylenediamine, p-phenylenediamine, o-phenylenediamine, 1,3,5-triaminobenzene, 1,2,4-triaminobenzene, 3,5-diaminobenzoic acid, 2,4-diaminotoluene, 2,4-diaminoanisole, 2,4-diaminophenol dihydrochloride, dimethyl-phenylenediamine, 1,4-cyclohexanediamine, 1,2-cyclohexanediamine, piperazine, ethylene glycol amine, ethylenediamine, propanediamine, butanediamine, hexamethylenediamine, ethanolamine, polyethyleneimine, triethylamine, tri(2-aminoethyl) amine, diethylenetriamine, N-(2-hydroxyethyl)ethylenediamine, 1,3-cyclohexanediamine, 1,3-dipiperidylpropane, 4-aminomethylpiperazine, ethanolamine, diethanolamine, hexanediol amine, and diglycolamine.

Preferably, the amine monomer is one or more of m-phenylenediamine, p-phenylenediamine, o-phenylenediamine, p-toluenediamine, m-toluenediamine, o-toluenediamine, and biphenyl diamine.

In the second solution, the concentration of the amine monomer is 0.5 wt. % to 10 wt. %, preferably 2 wt. % to 5 wt. %.

According to the preparation method for a composite reverse osmosis membrane of the present disclosure, the acyl chloride monomer is one or more of phthaloyl chloride, isophthaloyl chloride, terephthaloyl chloride, biphenyl-dicarbonyl chloride, trimesoyl chloride and a ternary acyl chloride having a structure represented by the following general formula (1):

General formula (1)

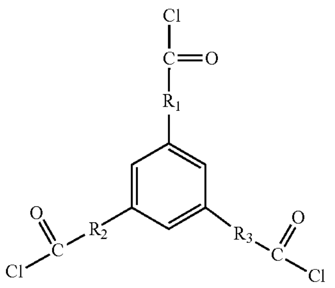

wherein $R_1$, $R_2$, $R_3$ are each independently at least one of the following groups:

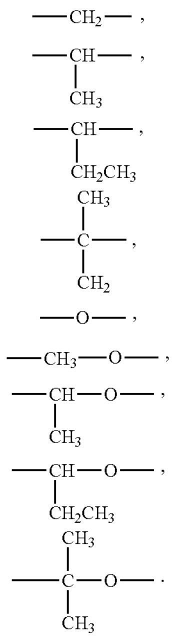

Preferably, the acyl chloride monomer is one or more of phthaloyl chloride, isophthaloyl chloride and trimesoyl chloride.

In the third solution, the concentration of the acyl chloride monomer is 0.05 wt. % to 5 wt. %, preferably 0.1 wt. % to 2 wt. %.

The solvent in the third solution may be at least one of n-hexane, cyclohexane, n-heptane and isoalkane solvent Isopar G.

A non-limiting example of the preparation method for a composite reverse osmosis membrane of the present disclosure may be shown as follows:

A first solution with an amphiphilic block copolymer concentration of 0.01 wt. % to 10 wt. % is applied onto a polysulfone porous support membrane to form an amphiphilic block copolymer modification layer; subsequently, the amphiphilic block copolymer modification layer is sequentially contacted with a second solution in which the concentration of an ether having a cyclic structure is 0.01 wt. % to 10 wt. % and the concentration of an amine monomer is 0.5 wt. % to 10 wt. % and a third solution in which the concentration of an acyl chloride monomer is 0.05 wt. % to 5 wt. % to carry out interfacial polymerization to form a hybrid polyamide functional layer containing an ether having a cyclic structure.

In the preparation method of the present disclosure, the post-treatment is preferably to remove excess solution on the surface of the composite reverse osmosis membrane and then clean the same, for example, cleaning with deionized water. More preferably, an aqueous solution with a glycerol concentration of 10 wt. % is used for moisturizing treatment. Followed by drying, the drying temperature is not particularly limited, usually 30° C. to 100° C., and the drying time is not particularly limited, either, usually 1 to 20 minutes.

EXAMPLES

The present disclosure is further described in detail through the following specific examples, but the present disclosure is not limited to these examples. It should be noted that the reagents and raw materials used in the examples of the present disclosure are all commercially available conventional products unless otherwise specified.

COMPARATIVE EXAMPLES

A polysulfone ultrafiltration support layer was immersed for 5 minutes in an aqueous solution with a p-phenylenediamine concentration of 3.5 wt. %, of which the pH was 11 and the temperature was 30° C., and then the polysulfone ultrafiltration support layer was taken out and surface-dried at room temperature with an air knife. The surface-dried polysulfone ultrafiltration support layer was immersed in a cyclohexane solution containing 0.2 wt. % trimesoyl chloride to carry out interfacial polymerization at 25° C. for 30 seconds, then taken out and dried at 50° C. The dried composite membrane was moisturized by an aqueous solution with glycerol concentration of 10 wt. % and dried at 100° C., to obtain a composite reverse osmosis membrane of comparative example.

Example 1

At room temperature, 0.5 g of polylactic acid-polyallyl lactide-b-polyethylene glycol-amino was dispersed in 99.5 g of acetone to prepare a first solution with an amphiphilic block copolymer concentration of 0.5 wt. %.

The first solution was evenly coated on a polysulfone porous support membrane, and dried at 30° C. to prepare a polysulfone porous support membrane having an amphiphilic block copolymer modification layer, which was then immersed for 5 minutes in a second solution in which the concentration of m-phenylenediamine was 3.5 wt. %, the content of aza-12-crown ether-4 was 2 wt. %, the solvent was water, the pH value was 11, and the temperature was 30° C. The membrane was then taken out and surface-dried at room temperature with an air knife. Next, the membrane was immersed in a cyclohexane solution containing 0.2 wt. % trimesoyl chloride to carry out interfacial polymerization at 25° C. for 30 seconds.

Then the membrane was taken out and dried at 50° C. The dried composite membrane was moisturized by an aqueous solution with a glycerol concentration of 10 wt. % and dried at 100° C., to finally obtain a composite reverse osmosis membrane.

Example 2

At room temperature, 1.0 g of polylactic acid-polyallyl lactide-b-polyethylene glycol-amino was dispersed in 99 g of acetone to prepare a first solution with an amphiphilic block copolymer concentration of 1.0 wt. %.

The first solution was evenly coated on a polysulfone porous support membrane, and dried at 30° C. to prepare a polysulfone porous support membrane having an amphiphilic block copolymer modification layer.

The modified polysulfone porous support membrane was immersed for 5 minutes in a second solution in which the concentration of m-phenylenediamine was 4.0 wt. %, the solvent was water, and the temperature was 30° C. The membrane was then taken out and surface-dried at room temperature with an air knife. The surface-dried membrane was immersed in a cyclohexane solution containing 0.2 wt. % trimesoyl chloride and 1 wt. % aza-12-crown ether-4 to react at 25° C. for 30 seconds.

Then the membrane was taken out and dried at 50° C. The dried composite membrane was moisturized by an aqueous solution with a glycerol concentration of 10 wt. % and dried at 100° C., to finally obtain a composite reverse osmosis membrane.

The composite reverse osmosis membranes obtained in the Comparative Example and Examples 1-2 were subject to tests for flux, desalination rate, boron removal rate and resistance to contamination.

Test Conditions for Flux and Desalination (NaCl) Rate of the Membrane:

The membrane was placed in a membrane testing platform, and the water flux and solute removal rate of the membrane were tested at different running times under the testing conditions of an operating pressure of 800 psi, raw water of 32000 ppm NaCl solution, a solution temperature of 25° C. and a pH value of 6.5-7.5.

Solute removal rate (R) refers to the difference between the solute concentration (C) in the feed liquid and the solute concentration (Cp) in the permeate under certain operating conditions, divided by the solute concentration in the feed liquid, and the calculation formula thereof is:

$$R = \frac{C - Cp}{C} \times 100\%$$

In this formula, R is the solute removal rate, also referred to as desalination rate (%); C is the solute concentration of the feed liquid, that is, the mass concentration of the stock solution; Cp is the solute concentration of the permeate, that is, the mass concentration of the permeate.

Water flux (F) refers to the volume (V) of water that permeates unit membrane area (S) in unit time (t) under certain operating conditions, and the unit of water flux (F) is $L \cdot m^{-2} \cdot h^{-1}$(LMH); V is the volume of the permeate (in unit of L); S is the effective surface area of the membrane (in unit of $m^2$); t is the penetration time (in unit of hour).

The calculation formula of water flux (F) is:

$$F = \frac{V}{S \times t}$$

The conversion relationship between different units of flux is: GFD=LMH/1.7.

Test Method of Boron Removal Rate:

The boron removal rate of the membrane was tested according to Section 1.4 Inductively Coupled Plasma Emission Spectrometry on page 5 of the Chinese standard GBT 5750.6-2006.

Test Method of Contamination Resistance:

The membrane was placed in a membrane testing platform, and the attenuation rate $F_{BSA}$(%) of water flux after the membrane run for 10 hours was tested under the testing conditions of an operating pressure of 800 psi, raw water of 0.2 wt. % BSA (bovine serum albumin) aqueous solution, a solution temperature of 25° C. and a pH value of 6.5-7.5.

$$F_{BSA} = (F_{t=0} - F_{t=10})/F_{t=0} \times 100\%$$

In this formula, $F_{t=0}$ and $F_{t=10}$ are the initial flux of the membrane and the flux after 10 hours of operation, respectively.

TABLE 1

| | Initial flux (GFD) | Desalination (NaCl) rate (%) | Boron removal rate (%) | Flux attenuation rate (%) |
|---|---|---|---|---|
| Comparative Example | 17.8 | 99.74 | 87.4 | 42.3 |
| Example 1 | 22.1 | 99.87 | 94.2 | 10.2 |
| Example 2 | 25.6 | 99.85 | 93.3 | 13.8 |

In view of the results shown in Table 1, as compared with the composite reverse osmosis membrane of the Comparative Example, the composite reverse osmosis membrane of the present disclosure had significantly increased initial flux and a water flux of 20 to 30 GFD, and the flux attenuation rate was apparently reduced, which could be as low as 10.2%. Therefore, the composite reverse osmosis membrane of the present disclosure showed excellent contamination resistance, the desalination (NaCl) rate and boron removal rate were also significantly improved, the removal rate of sodium chloride could be as high as 99.85% or more, the removal rate of boron could be as high as 93% or more, and it also had excellent anti-contamination capability.

Figure 2:
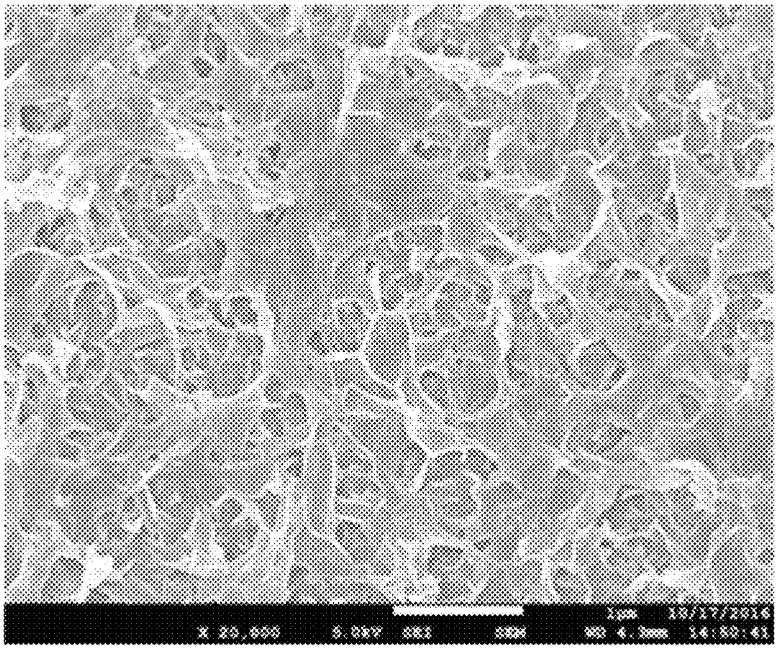
FIG. 2 is a scanning electron microscope image of the surface of a composite reverse osmosis membrane prepared in Example 1 of the present disclosure.

FIG. 1 is a scanning electron microscope image of the cross section of a composite reverse osmosis membrane prepared in Example 1. FIG. 1 shows that the thickness of the desalination layer is relatively high, reaching 362 nm to 457 nm, and the thickness distribution is uniform. FIG. 2 is a scanning electron microscope image of the surface of a composite reverse osmosis membrane prepared in Example 1. From FIG. 2, it may be seen that the desalination layer on the surface has a flat and smooth surface.

INDUSTRIAL AVAILABILITY

The preparation method of the present disclosure may realize the preparation of a composite reverse osmosis membrane having a high flux, a high desalination rate and high contamination resistance in a simple operation and high reaction efficiency manner. The composite reverse osmosis membrane prepared in the present disclosure may be advantageously used for desalination of seawater.

What is claimed is:

1. A composite reverse osmosis membrane, comprising:

a non-woven fabric layer, a polymer porous support layer, an amphiphilic block copolymer modification layer, and a hybrid polyamide functional layer:

wherein the polymer porous support layer is disposed on the non-woven fabric layer, the amphiphilic block copolymer modification layer is disposed on the surface of the polymer porous support layer, and the hybrid polyamide functional layer is disposed on the amphiphilic block copolymer modification layer;

wherein the amphiphilic block copolymer contains hydrophilic blocks and lipophilic blocks, the hybrid polyamide functional layer contains an ether having a cyclic structure present in the hybrid polyamide functional layer in a physical doping mode or a chemical bonding mode, and the amphiphilic block copolymer modification layer contains one or more of the following block copolymers: polystyrene-b-polyethylene glycol, DL-polylactic acid-b-polyacrylic acid, polyglycolide-b-polyethylene glycol-polyglycolide, polystyrene-b-DL-polylactic acid, polystyrene-b-L-polylactic acid, polyethylene glycol-b-polyethyleneimine, polycaprolactone-b-polyethyleneimine, polylactic acid-glycolic acid-b-polylysine, polyethylene glycol-b-polylactic acid-polycaprolactone, polylactic acid-polycaprolactone-b-polyethylene glycol-maleimide, polylactic acid-polycaprolactone-b-polyethylene glycol-amino, polylactic acid-polycaprolactone-b-polyethylene glycol-carboxyl, polylactic acid-polycaprolactone-b-polyethylene glycol-activated ester, polylactic acid-b-polyethylene glycol amino, polylactic acid-b-polyethylene glycol carboxyl, polylactic acid-b-polyethylene glycol hydroxyl, polylactic acid-polycaprolactone-b-polyethylene glycol-folic acid, polylactic acid-polyallyl lactide-b-polyethylene glycol-amino, polylactic acid-polyallyl lactide-b-polyethylene glycol, polylactic acid-polyallyl lactide-b-polyethylene glycol-maleimide, polylactic acid-polycaprolactone-b-polyethylene glycol, polyacrylic acid-b-polyacrylamide, polyacrylic acid-b-polymethyl methacrylate, poly (n-butyl acrylate)-b-polyacrylic acid, poly(n-butyl acrylate)-b-polyacrylamide, poly(tert-butyl methacrylate)-b-polyoxyethylene, polymethyl methacrylate-b-polyacrylic acid, polyneopentyl ester-b-polymethacrylic acid, polyoxyethylene-b-polyacrylic acid, polyoxyethylene-b-polyacrylamide, polytetrahydrofuran-b-polyoxybutylene, polyoxyethylene-b-polycaprolactone, polyoxyethylene-b-polylactic acid, polyoxyethylene-b-polypropylene oxide, polyoxyethylene-b-poly(nitrobenzyl methacrylate), polyoxyethylene-b-poly (N-isopropylacrylamide), polyoxyethylene-b-poly (tert-butyl acrylate), polyoxyethylene-b-poly (tert-butyl methacrylate), polyoxyethylene-b-polymethyloxazoline, polyoxyethylene-b-polylactide, polyisobutylene-b-polyacrylic acid, polyisobutylene-b-polyoxyethylene, polystyrene-b-polyacrylamide, polystyrene sulfonic acid-b-polymethylbutene, poly(sodium 4-styrene sulfonate)-b-polyoxyethylene, polydimethylsiloxane-b-polyoxyethylene, polydimethylsiloxane-b-polymethacrylic acid, polyvinylpyridine-b-polyoxyethylene, polymethacrylic acid-b-polyneopentyl ester, polymethacrylic acid-b-poly(hydroxyethyl methacrylate), polymethacrylic acid-b-polycaprolactone, polystyrene-b-polylactic acid, poly(lactic acid glycolic acid)-b-polyethylene glycol maleimide, poly (lactic acid glycolic acid)-b-polyethylene glycol carboxyl, poly lactic acid glycolic acid)-b-polyethylene glycol amino, poly(lactic acid glycolic acid) copolymer-b-polyethylene glycol hydroxyl, poly(lactic acid glycolicacid) copolymer-b-polyethylene glycol active ester, poly(lactic acid glycolic acid) copolymer-b-polyethylene glycol biotin, poly(lactic acid glycolic acid) copolymer-b-polyethylene glycol azide, poly(lactic acid glycolic acid) copolymer-b-polyethylene glycol phospholipid, poly(lactic acid glycolic acid) copolymer-b-polyethylene glycol aldehyde group, poly(lactic acid glycolic acid) copolymer-b-polyethylene glycol propylene ester, and poly(lactic acid glycolic acid) copolymer-b-polyethyleneimine.

2. The composite reverse osmosis membrane according to claim 1, wherein the polymer porous support layer is one or more of polysulfone porous support layer, polyethersulfone porous support layer, polyacrylonitrile porous support layer, polyethyleneimine porous support layer, polyarylethersulfone ketone porous support layer, polyvinylidene fluoride porous support layer, and sulfonated polyethersulfone porous support layer; the polyamide is aromatic polyamide and/or aliphatic polyamide.

3. The composite reverse osmosis membrane according to claim 1, wherein the amphiphilic block copolymer has an HLB value of 3 to 40.

4. The composite reverse osmosis membrane according to claim 1, wherein the ether having a cyclic structure is a cyclic ether containing a structural unit $(CH_2CH_2Y)_n$, wherein Y is at least one selected from heteroatoms O, N, S, and P, n is an integer and $3 \leq n \leq 10$.

5. A preparation method for a composite reverse osmosis membrane, comprising steps of:

preparing a base membrane, wherein the base membrane comprises a polymer porous support layer on a non-woven fabric layer;

preparing an amphiphilic block copolymer solution as a first solution and coating the solution on the polymer porous support layer to form an amphiphilic block copolymer modification layer, wherein the amphiphilic block copolymer modification layer contains one or more of the following block copolymers: polystyrene-b-polyethylene glycol, DL-polylactic acid-b-polyacrylic acid, polyglycolide-b-polyethylene glycol-polyglycolide, polystyrene-b-DL-polylactic acid, polystyrene-b-L-polylactic acid, polyethylene glycol-b-polyethyleneimine, polycaprolactone-b-polyethyleneimine, polylactic acid-glycolic acid-b-polylysine, polyethylene glycol-b-polylactic acid-polycaprolactone, polylactic acid-polycaprolactone-b-polyethylene glycol-maleimide, polylactic acid-polycaprolactone-b-polyethylene glycol-amino, polylactic acid-polycaprolactone-b-polyethylene glycol-carboxyl, polylactic acid-polycaprolactone-b-polyethylene glycol-activated ester, polylactic acid-b-polyethylene glycol amino, polylactic acid-b-polyethylene glycol carboxyl, polylactic acid-b-polyethylene glycol hydroxyl, polylactic acid-polycaprolactone-b-polyethylene glycol-folic acid, polylactic acid-polyallyl lactide-b-polyethylene glycol-amino, polylactic acid-polyallyl lactide-b-polyethylene glycol, polylactic acid-polyallyl lactide-b-polyethylene glycol-maleimide, polylactic acid-polycaprolactone-b-polyethylene glycol, polyacrylic acid-b-polyacrylamide, polyacrylic acid-b-polymethyl methacrylate, poly(n-butyl acrylate)-b-polyacrylic acid, poly(n-butyl acrylate)-b-polyacrylamide, poly (tert-butyl methacrylate)-b-polyoxyethylene, polymethyl methacrylate-b-polyacrylic acid, polyneopentyl ester-b-polymethacrylic acid, polyoxyethylene-b-polyacrylic acid, polyoxyethylene-b-polyacrylamide, polytetrahydrofuran-b-polyoxybutylene, polyoxyethylene-b-polycaprolactone, polyoxyethylene-b-polylactic acid, polyoxyethylene-b-polypropylene oxide, polyoxyethylene-b-poly(nitrobenzyl methacrylate), polyoxyethylene-b-poly (N-isopropylacrylamide), polyoxyethylene-b-poly(tert-butyl acrylate), polyoxyethylene-b-poly (tert-butyl methacrylate), polyoxyethylene-b-polymethyloxazoline, polyoxyethylene-b-polylactide, polyisobutylene-b-polyacrylic acid, polyisobutylene-b-polyoxyethylene, polystyrene-b-polyacrylamide, polystyrene sulfonic acid-b-polymethylbutene, poly(sodium 4-styrene sulfonate)-b-polyoxyethylene, polydimethylsiloxane-b-polyoxyethylene, polydimethylsiloxane-b-polymethacrylic acid, polyvinylpyridine-b-polyoxyethylene, polymethacrylic acid-b-polyneopentyl ester, polymethacrylic acid-b-poly (hydroxyethyl methacrylate), polymethacrylic acid-b-polycaprolactone, polystyrene-b-polylactic acid, poly (lactic acid glycolic acid)-b-polyethylene glycol maleimide, poly(lactic acid glycolic acid)-b-polyethylene glycol carboxyl, poly lactic acid glycolic acid)-b-polyethylene glycol amino, poly(lactic acid glycolic acid) copolymer-b-polyethylene glycol hydroxyl, poly lactic acid glycolic acid) copolymer-b-polyethylene glycol active ester, poly lactic acid glycolic acid) copolymer-b-polyethylene glycol biotin, poly(lactic acid glycolic acid) copolymer-b-polyethylene glycol azide, poly (lactic acid glycolic acid) copolymer-b-polyethylene glycol phospholipid, poly (lactic acid glycolic acid) copolymer-b-polyethylene glycol aldehyde group, poly(lactic acid glycolic acid) copolymer-b-polyethylene glycol propylene ester, and poly(lactic acid glycolic acid) copolymer-b-polyethyleneimine;

contacting the non-woven fabric formed with the amphiphilic block copolymer modification layer and the polymer porous support layer with an aqueous solution containing an amine monomer as a second solution and an oil-phase solution containing an acyl chloride monomer as a third solution in sequence, wherein at least one of the second solution and the third solution contains an ether having a cyclic structure to form a hybrid polyamide functional layer containing the ether having a cyclic structure, and the hybrid polyamide functional layer is formed on the amphiphilic block copolymer modification layer; and performing post-treatment and drying to obtain a composite reverse osmosis membrane.

6. The preparation method for a composite reverse osmosis membrane according to claim 5, wherein the polymer porous support layer is one or more of polysulfone porous support layer, polyethersulfone porous support layer, polyacrylonitrile porous support layer, polyethyleneimine porous support layer, polyarylethersulfone ketone porous support layer, polyvinylidene fluoride porous support layer, and sulfonated polyethersulfone porous support layer; the polyamide is aromatic polyamide and/or aliphatic polyamide.

7. The preparation method for a composite reverse osmosis membrane according to claim 5, wherein the first solution comprises an amphiphilic block copolymer and a first solvent, the amphiphilic block copolymer contains hydrophilic blocks and lipophilic blocks, the amphiphilic block copolymer has an HLB value of 3 to 40, and the first solvent is one or more of methanol, ethanol, propanol, butanol, acetone, tetrahydrofuran, dimethyl sulfoxide, sulfolane, N,N-dimethylformamide, N,N-dimethylacetamide, water, toluene, xylene, chloroform, ISOPAR-G, ISOPAR-E, ISOPAR-L, n-butane, n-heptane, cyclohexane, and ethyl cyclohexane; or, the concentration of the amphiphilic block copolymer in the first solution is 0.01 wt. % to 10 wt. %.

8. The preparation method for a composite reverse osmosis membrane according to claim 5, wherein the ether having a cyclic structure is a cyclic ether containing a structural unit $(CH_2CH_2Y)_n$, wherein Y is at least one selected from heteroatoms O, N, S, and P, n is an integer and $3 \leq n \leq 10$; or, the concentration of the ether having a cyclic structure in at least one of the second solution and the third solution is 0.01 wt. % to 10 wt. %.

9. The preparation method for a composite reverse osmosis membrane according to claim 5, wherein the amine monomer is one or more of aniline, m-phenylenediamine, p-phenylenediamine, o-phenylenediamine, 1,3,5-triaminobenzene, 1,2,4-triaminobenzene, 3,5-diaminobenzoic acid, 2,4-diaminotoluene, 2,4-diaminoanisole, 2,4-diaminophenol dihydrochloride, dimethyl phenylenediamine, 1,4-cyclohexanediamine, 1,2-cyclohexanediamine, piperazine, ethylene glycol amine, ethylenediamine, propanediamine, butanediamine, hexamethylenediamine, ethanolamine, polyethyleneimine, triethylamine, tri (2-aminoethyl) amine, diethylenetriamine, N-(2-hydroxyethyl) ethylenediamine, 1,3-cyclohexanediamine, 1,3-dipiperidylpropane, 4-aminomethylpiperazine, ethanolamine, diethanolamine, hexanediol amine, and diglycolamine, and in the second solution, the concentration of the amine monomer is 0.5 wt. % to 10 wt. %;

the acyl chloride monomer is one or more of phthaloyl chloride, isophthaloyl chloride, terephthaloyl chloride, biphenyl-4,4'-dicarbonyl dichloride, trimesoyl chloride, and a ternary acyl chloride having a structure represented by the following general formula (1):

General formula (1)

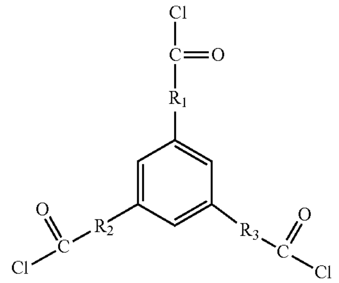

wherein $R_1$, $R_2$, $R_3$ are each independently at least one of the following groups:

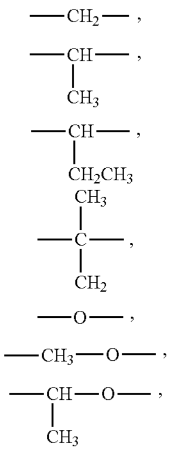

-continued

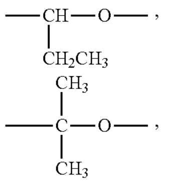

in the third solution, the concentration of the acyl chloride monomer is 0.05 wt. % to 5 wt. %.

10. The composite reverse osmosis membrane according to claim 2, wherein the amphiphilic block copolymer has an HLB value of 3 to 40.

11. The composite reverse osmosis membrane according to claim 2, wherein the ether having a cyclic structure is a cyclic ether containing a structural unit $(CH_2CH_2Y)_n$, wherein Y is at least one selected from heteroatoms O, N, S, and P, n is an integer and 3≤n≤10.

12. The preparation method for a composite reverse osmosis membrane according to claim 6, wherein the first solution comprises an amphiphilic block copolymer and a first solvent, the amphiphilic block copolymer contains hydrophilic blocks and lipophilic blocks, the amphiphilic block copolymer has an HLB value of 3 to 40, and the first solvent is one or more of methanol, ethanol, propanol, butanol, acetone, tetrahydrofuran, dimethyl sulfoxide, sulfolane, N,N-dimethylformamide, N,N-dimethylacetamide, water, toluene, xylene, chloroform, ISOPAR-G, ISOPAR-E, ISOPAR-L, n-butane, n-heptane, cyclohexane, and ethyl cyclohexane; or, the concentration of the amphiphilic block copolymer in the first solution is 0.01 wt. % to 10 wt. %.

13. The preparation method for a composite reverse osmosis membrane according to claim 7, wherein the ether having a cyclic structure is a cyclic ether containing a structural unit $(CH_2CH_2Y)_n$, wherein Y is at least one selected from heteroatoms O, N, S, and P, n is an integer and 3≤n≤10; or, the concentration of the ether having a cyclic structure in at least one of the second solution and the third solution is 0.01 wt. % to 10 wt. %.

14. The preparation method for a composite reverse osmosis membrane according to claim 6, wherein the amine monomer is one or more of aniline, m-phenylenediamine, p-phenylenediamine, o-phenylenediamine, 1,3,5-triaminobenzene, 1,2,4-triaminobenzene, 3,5-diaminobenzoic acid, 2,4-diaminotoluene, 2,4-diaminoanisole, 2,4-diaminophenol dihydrochloride, dimethyl phenylenediamine, 1,4-cyclohexanediamine, 1,2-cyclohexanediamine, piperazine, ethylene glycol amine, ethylenediamine, propanediamine, butanediamine, hexamethylenediamine, ethanolamine, polyethyleneimine, triethylamine, tri (2-aminoethyl) amine, 1,3-diethylenetriamine, N-(2-hydroxyethyl) ethylenediamine, cyclohexanediamine, 1,3-dipiperidylpropane, 4-aminomethylpiperazine, ethanolamine, diethanolamine, hexanediol amine, and diglycolamine, and in the second solution, the concentration of the amine monomer is 0.5 wt. % to 10 wt. %;

the acyl chloride monomer is one or more of phthaloyl chloride, isophthaloyl chloride, terephthaloyl chloride, biphenyl-4,4'-dicarbonyl dichloride, trimesoyl chloride, and a ternary acyl chloride having a structure represented by the following general formula (1):

General formula (1)

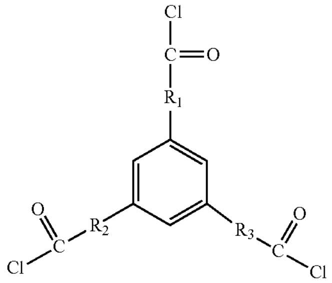

wherein $R_1$, $R_2$, $R_3$ are each independently at least one of the following groups:

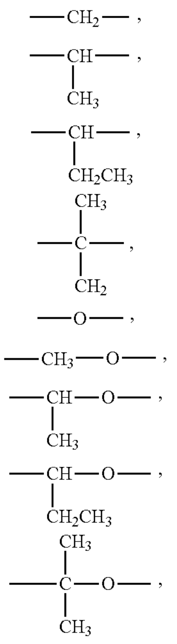

in the third solution, the concentration of the acyl chloride monomer is 0.05 wt. % to 5 wt. %.

* * * * *